United States Patent
Shimada

(10) Patent No.: US 7,522,210 B2
(45) Date of Patent: Apr. 21, 2009

(54) DIGITAL CAMERA FOR AUTOMATICALLY SETTING A PROPER EXPOSURE OF BOTH BACK ROUND AND OBJECT

(75) Inventor: Yoshinao Shimada, Tokyo (JP)

(73) Assignee: Olympus Corporation, Tokyo (JP)

( * ) Notice: Subject to any disclaimer, the term of this patent is extended or adjusted under 35 U.S.C. 154(b) by 757 days.

(21) Appl. No.: 10/754,765

(22) Filed: Jan. 9, 2004

(65) Prior Publication Data

US 2004/0189822 A1    Sep. 30, 2004

(30) Foreign Application Priority Data

Jan. 9, 2003    (JP) ............................. 2003-003504
Jan. 6, 2004    (JP) ............................. 2004-000786

(51) Int. Cl.
*H04N 5/238*    (2006.01)
*H04N 5/222*    (2006.01)

(52) U.S. Cl. ....................................... 348/364; 348/371

(58) Field of Classification Search .............. 348/229.1, 348/230.1, 254, 255, 257, 258, 362–366, 348/370, 371
See application file for complete search history.

(56) References Cited

U.S. PATENT DOCUMENTS

| 6,359,651 | B1* | 3/2002 | Yokonuma | 348/370 |
| 2002/0025165 | A1* | 2/2002 | Higuchi | 396/429 |
| 2003/0133021 | A1* | 7/2003 | Hamamura et al. | 348/229.1 |
| 2004/0109082 | A1* | 6/2004 | Yokonuma | 348/371 |

FOREIGN PATENT DOCUMENTS

JP    3348799    9/2002

* cited by examiner

*Primary Examiner*—Timothy J Henn
(74) *Attorney, Agent, or Firm*—Volpe and Koenig, P.C.

(57) ABSTRACT

In a first exposure condition calculating operation, proper exposure conditions in imaging are calculated by the imaging element including the effective exposure time and ISO sensitivity without preliminary light emission from the strobo part. In a second exposure condition calculating operation, the exposure condition is determined by compensating at least the ISO sensitivity among the exposure conditions calculated in the first exposure condition calculating operation by dimmer or light control operation with preliminary light emission of the strobo part. Exposure of the imaging element is executed as a regular imaging operation under the exposure condition calculated and determined in the second exposure condition calculating operation.

12 Claims, 6 Drawing Sheets

DIGITAL CAMERA FOR AUTOMATICALLY SETTING A PROPER EXPOSURE OF BOTH BACK ROUND AND OBJECT

CROSS REFERENCE TO RELATED APPLICATION(S)

This application claims benefit of Japanese Patent Applications No. 2003-003504 filed on Jan. 9, 2003 and No. 2004-000786 filed on Jan. 6, 2004, the contents of which are incorporated by the reference.

BACKGROUND OF THE INVENTION

The present invention relates to electronic still cameras with strobo capable of continuously emitting light.

With the recent spread of personal computers, electronic still cameras have been widely used, with which a CCD or like solid-state imaging element is used in lieu of silver salt film for picking up an optical image of a scene and directly obtaining electronic data of the picked-up image.

In this type of electronic still cameras, the solid-state imaging element has narrow latitude (i.e., dynamic range) compared to the silver salt film and also it is possible to make ready sensitivity adjustment by adjusting the gain of an amplifier which amplifies the electric signal of the image obtained by the solid-state imaging element. An increase in accuracy of the exposure control inclusive of the amplifier gain adjustment has been desired.

Cameras of this type include one, in which, when carrying out strobo photographing, prior to the regular photographing, preliminarily strobo light emission (hereinafter referred to as preliminary light emission) is caused in correspondence with shutter release button operation to detect the intensity of light reflected from the scene and check if the intensity of light emitted from the strobo is sufficient and, when it is decided that the strobo light intensity is insufficient, the gain of the amplifier is adjusted (i.e., the photographing sensitivity is increased) in such a manner as to make up for the insufficient light intensity before making the regular photographing by causing strobo light emission.

The operation described above is carried out in order to obtain an accurate exposure level (i.e., brightness of the picked-up image) in the photographing accompanied by the strobo light emission. At the time of increasing the photographing sensitivity as described above, the photographing sensitivity is determined without taking the exposure level, which has been determined in an AE (automatic exposure) process without strobo light emission right before the photographing, into consideration at all.

In this case, when the amplifier gain is increased to meet the main foreground subject of scene, which is located at a position relatively close to the camera and in a strobo photographing range, proper exposure level can be obtained with respect to the main foreground subject. However, excessive exposure may result with respect to the background part in a range, which cannot be reached by the strobo light in the AE (automatic exposure control). Therefore, the background part may often be in a "defective white balance" state. For instance, when the face of a person M as the main foreground subject is picked up to be fairly good, a relatively remote scene as background has an observation factor corresponding to "defective white balance", and even its profile is not clear.

Techniques concerning exposure control by the relation between amplifier gain and strobo light intensity have also been proposed (see Literature 1: Japanese Patent publication No. 3348799, for instance).

Again in such techniques, however, as stated in paragraph [0030] in the above literature, regarding the amplifier gain, either a "preset level" which has been preliminarily set is automatically increased, or the user presets the amplifier gain by manual operation, and the amplifier gain is not automatically preset to a proper gain corresponding to the exposure level of a background part which is not reached by strobo light.

As described above, no camera has been provided at present, in which when calculating the proper exposure by obtaining light reflected from the main foreground subject in the preliminary strobo light emission, a background part which is not reached by the strobo light is taken into consideration for photographing with proper exposure over the whole image.

SUMMARY OF THE INVENTION

The present invention was made in view of the above background affairs, and it has an object of providing an electronic still camera, which can execute strobo photographing by automatically calculating and presetting proper exposure levels for both of the main foreground subject and the background in a range not reached by strobo light.

According to an aspect of the present invention, there is provided a digital camera comprising an imaging element for providing a photo-electric output corresponding to an image of a scene focused on an imaging surface of the imaging element, an exposure time control part for controlling the exposure time effective in the imaging element, a sensitivity control function part for controlling the ISO sensitivity of the camera corresponding to the amplification factor of the photo-electric output of the imaging element and a strobo part for projecting light onto the scene, the digital camera further comprising: a main control part for collectively controlling a first exposure condition calculating operation of calculating proper exposure conditions in imaging by the imaging element including the effective exposure time and ISO sensitivity without preliminary light emission from the strobo part, a second exposure condition calculating operation of the exposure condition by compensating at least the ISO sensitivity among the exposure conditions calculated in the first exposure condition calculating operation by dimmer or light control operation with the preliminary light emission of the strobo part, and an operation of causing exposure in the imaging element as a regular imaging operation under the exposure condition calculated and determined in the second exposure condition calculating operation.

The main control part sets, in the second exposure condition calculating operation, the exposure condition used for the regular imaging operation by compensating for the effective exposure time calculated in the first exposure condition calculating operation.

The control part determines the exposure condition to be applied to the regular imaging operation with compensation of the ISO sensitivity calculated in the first exposure condition calculating operation with execution of the second exposure condition calculating operation by calculating, as the effective exposure time, a first exposure time with provision of a condition that this exposure time is within a predetermined threshold value, and a second exposure time without providing said condition, and calculating the necessary extent of control of the ISO sensitivity corresponding to the difference between the first and second exposure times.

The main control part calculates the exposure condition to be applied to the regular imaging operation with compensation of the ISO sensitivity calculated in the first exposure condition calculating operation and the effective exposure time with execution of the second exposure condition calculating operation by calculating, as the effective exposure time, a first exposure time with provision of a condition that this exposure time is within a predetermined threshold value, and a second exposure time without providing said condition, and calculating the necessary extent of control of the ISO sensitivity and the effective exposure time corresponding to the compensation of the difference between the first and second exposure times, taking at least the calculated value into consideration.

According to another aspect of the present invention, there is provided a digital camera comprising an imaging element for providing a photo-electric output corresponding to an image of a scene focused on an imaging surface, an exposure time control part for controlling the exposure time effective in the imaging element, a sensitivity control function part for controlling the ISO sensitivity of the camera corresponding to the amplification factor of the photo-electric output of the imaging element and a strobo part for projecting light onto the scene, the digital camera further comprising: a main control part for collectively controlling a first exposure condition calculating operation of calculating proper exposure conditions in imaging by the imaging element including the effective exposure time and ISO sensitivity without preliminary light emission from the strobo part, a second exposure condition calculating operation of the exposure condition by compensating at least the ISO sensitivity among the exposure conditions calculated in the first exposure condition calculating operation by dimmer or light control operation with the preliminary light emission of the strobo part, and an operation of causing exposure in the imaging element as regular imaging operation under the exposure condition calculated and determined in the second exposure condition calculating operation, the main control part executing, in a first control mode in which the effective exposure time is not limited to be within the predetermined threshold value, the calculating of the exposure condition to be applied to the regular imaging operation by compensating the effective exposure time calculated in the first exposure condition calculating operation, and executing, in a second control mode in which the effective exposure time is limited to be within the predetermined threshold value, the calculating of the exposure condition to be applied to the regular imaging operation with compensation of the ISO sensitivity calculated in the first exposure condition calculating operation by calculating, as effective exposure time, a first exposure time with provision of a condition that this exposure time is within a predetermined threshold, and a second exposure time without providing said condition, and calculating the necessary extent of control of the ISO sensitivity corresponding to the compensation of the difference between the first and second exposure times, taking at least the calculated value into consideration.

According to other aspect of the present invention, there is provided a digital camera comprising an imaging element for providing a photo-electric output corresponding to an image of a scene focused on an imaging surface, an exposure time control part for controlling the exposure time effective in the imaging element, a sensitivity control function part for controlling the ISO sensitivity of the camera corresponding to the amplification factor of the photo-electric output of the imaging element and a strobo part for projecting light onto the scene, the digital camera further comprising: a main control part for collectively controlling a first exposure condition calculating operation of calculating proper exposure conditions in imaging by the imaging element including the effective exposure time and ISO sensitivity without preliminary light emission from the strobo part, a second exposure condition calculating operation of the exposure condition by compensating at least the ISO sensitivity among the exposure conditions calculated in the first exposure condition calculating operation by dimmer or light control operation with the preliminary light emission of the strobo part, and an operation of causing exposure in the imaging element as regular imaging operation under the exposure condition calculated and determined in the second exposure condition calculating operation, the main control part executing, in a first control mode in which the effective exposure time is not limited to be within the predetermined threshold value, the calculating of the exposure condition to be applied to the regular imaging operation by compensating the effective exposure time calculated in the first exposure condition calculating operation, and executing, in a second control mode in which the effective exposure time is limited to be within the predetermined threshold value, the calculating of the exposure condition to be applied to the regular imaging operation with compensation of the ISO sensitivity calculated in the first exposure condition calculating operation and the effective exposed time by calculating, as effective exposure time, a first exposure time with provision of a condition that this exposure time is within a predetermined threshold, and a second exposure time without providing the condition, and calculating the necessary extent of control of the ISO sensitivity corresponding to the compensation of the difference between the first and second exposure times and the effective exposed time, taking at least the calculated value into consideration.

Other objects and features will be clarified from the following description with reference to attached drawings.

BRIEF DESCRIPTION OF THE DRAWING(S)

PREFERRED EMBODIMENTS OF THE INVENTION

Preferred embodiments of the present invention will now be described with reference to the drawings.

A first embodiment of a digital camera according to the present invention will be described.

Figure 1:
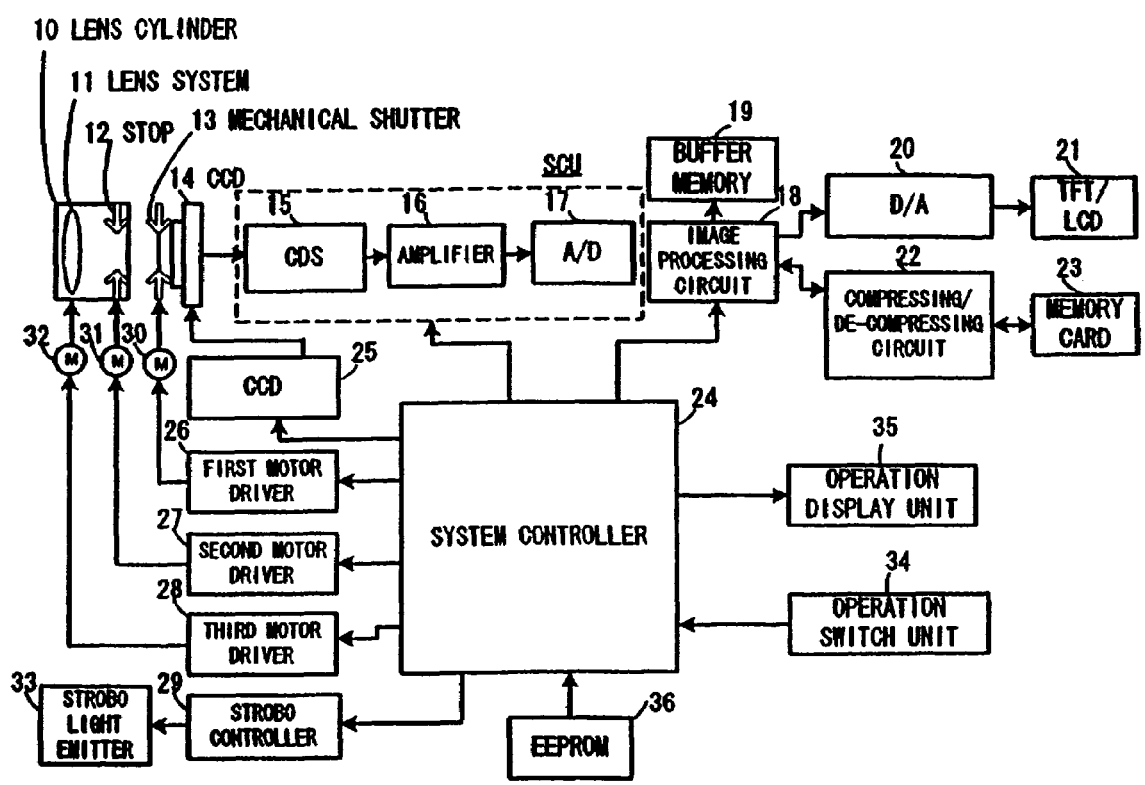
FIG. 1 shows a circuit construction of a first embodiment of the digital camera according to the present invention.

FIG. 1 shows the circuit construction of the embodiment of the digital camera 1. Referring to the Figure, reference numeral 10 designates a lens cylinder of the digital camera 1. The lens cylinder 10 accommodates a lens system 11 and a stop 12.

An optical image which is obtained via the lens cylinder 10, is focused through a mechanical shutter 13 on an image pick-up surface of a CCD 14 as solid-state imaging element.

The CCD 14, as is well-known in the art, accumulates charge on each pixel during the exposure time, and outputs the accumulated charge. The output is coupled via a correlated double sampling circuit 15 (hereinafter abbreviated as CDS, the imaging element sampling itself being well known in the art) to an amplifier 16 for being amplified with an appropriate gain, and then converted in an A/D converter 17 to a digital signal, which is fed to an image processing circuit 18.

The image processing circuit 18 temporarily stores the digital image signal in a buffer memory 19, and executes various predetermined signal processes, including a pixel interpolation process by reading out the image signal stored and held in the buffer memory 19.

The image processing circuit 18 outputs the image signal, obtained after the various signal processes, to a D/A converter 20 to generate analog data, which is displayed for monitoring on a TFT-LCD panel 21 having back-light.

The image signal obtained in the image processing circuit 18 is also fed out to a compressing/de-compressing circuit 22 for appropriate data compression in a designated data compression method, for instance JPEG or the like. The compressed data is recorded and stored in a detachable memory card 23, which is constituted by a flash memory and used as recording medium of the digital camera 1.

In the play mode, the image signal stored in the memory card 23 is read out and de-compressed in the compressing/de-compressing circuit 22 in a method converse to that in the recording mode to be restored to bit-map-like image signal. The image signal thus obtained in the restoring process is stored by the digital processing circuit 18 in the buffer memory 19, and then fed out via the above D/A converter 20 to the above TFT-LCD 21.

This embodiment of digital camera 1 further comprises a system controller 24 which serves to collectively control the entire camera. To the system controller 24 are connected the above amplifier 16 and image processing circuit 18 and further a CCD driver 25 for driving the CCD 14 noted above.

To the system controller 24 are further connected a first to a third motor driver 26 to 28 and a strobo controller 29.

The first motor driver 26 drives a first motor (M) 30 for causing opening and closing operations of the mechanical shutter 13.

The second motor driver 27 drives a second motor 31 for causing an adjusting operation of the stop 12.

The third motor driver 28 drives a third motor 32 for causing movement (displacement) of the lens system 11.

The strobo controller 29 executes switching control of charging and light emission of a strobo light emitter 33 in response to instructions from the system controller 24.

To the system controller 24, are directly inputted operation signals from an operation switch (SW) unit 34, which include a power supply switch, a release switch, a zoom switch, a strobo switch, a cursor switch, a menu switch, etc. (these switches being not shown for simplicity). The system controller 24 also outputs data of operation states of the switches accompanying the operation thereof and also data of the state of recording in the memory card 23 for display on an operation display unit 35, which is constituted by a monochromic LCD panel having back-light. To the system controller 24 is further connected to an EEP ROM 36, which is a non-volatile memory with a stored control program for causing collective operation of all the above circuits. The above CDS 15, amplifier 16 and A/D converter 17 shown enclosed in a dashed line rectangle in FIG. 1, constitutes an SCU (sensitivity control function unit) for determining the ISO sensitivity (described later) in this embodiment of the digital camera 1.

The operation of the above first embodiment will now be described.

Figure 2:
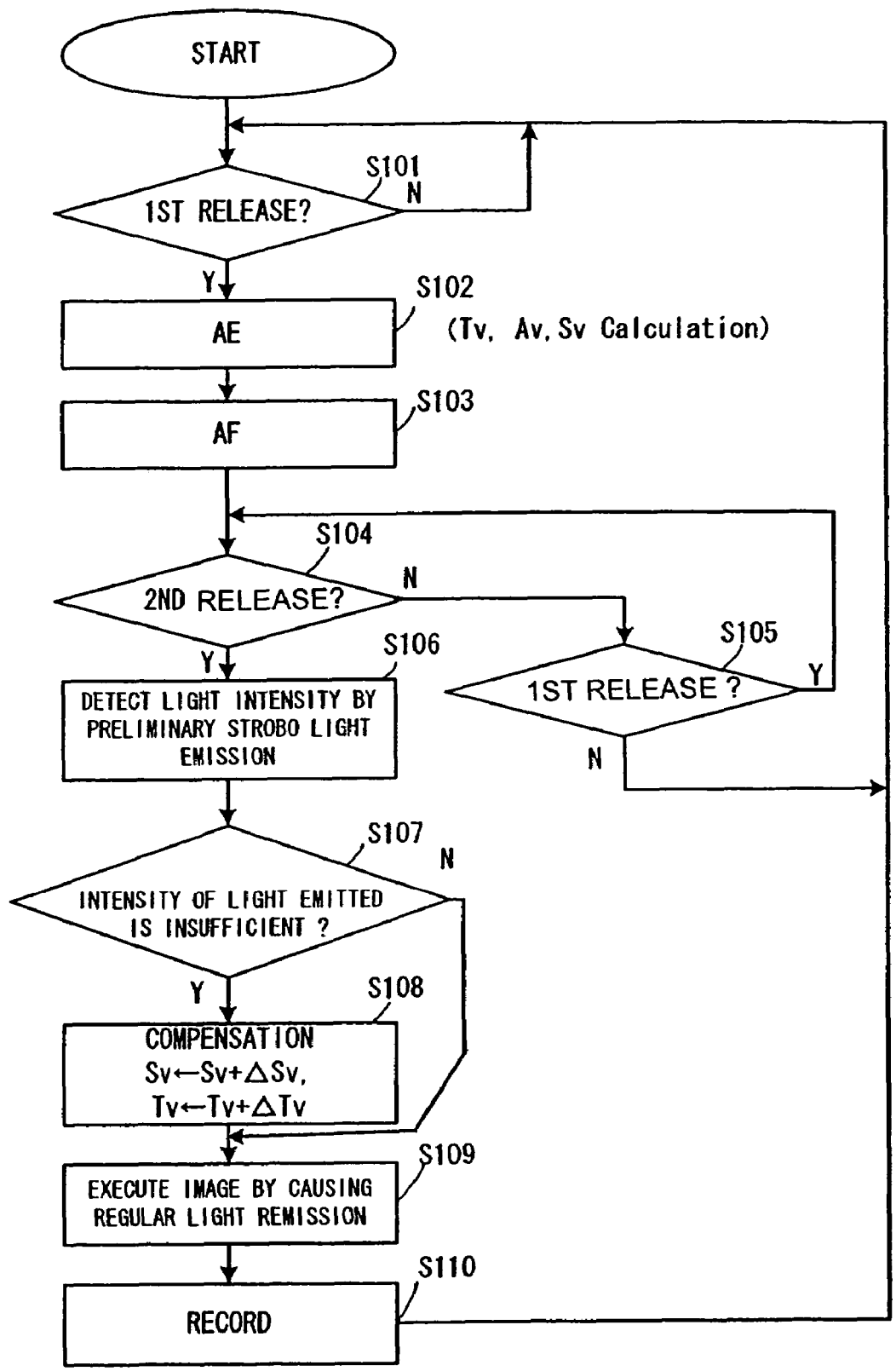
FIG. 2 shows a flow chart illustrating an imaging process in a slow synchronous mode in the first embodiment.

FIG. 2 shows the flow diagram of an imaging process in a slow synchronous mode, in which the main foreground subject of scene such as a person is illuminated by strobo light while at the same time the background is imaged in at a slow shutter speed. All the controls including the exposure level correction are executed under collective control of pertinent parts by the system controller 24.

The shutter release switch in the operation switch unit 34 is operable step-wise in two strokes. Half depression of the switch causes an operation of a first stroke (referred to as "first release") in the specification and drawings), in which AE (auto exposure) without strobo light emission and AF (auto focusing) are executed. Subsequent switch depression causes an operation of a second-step stroke (hereinafter referred to as second release). In this operation, the strobo light emitter 33 is first preliminarily driven for light emission (hereinafter referred to as "preliminary light emission") to correct the exposure level, and then it is driven again for light emission (hereinafter referred to as regular light emission) to execute the imaging.

Shutter speed Tv, stop value Av and imaging sensitivity (ISO sensitivity) corresponding to the gain of the amplifier 16, as will be described later, are all based on the well-known APEX system. For example, shutter speed Tv of "6" corresponds to 1/60 sec., stop value Av of "3" corresponds to F2.8, and ISO sensitivity Sv of "5" corresponds to ISO100.

At the outset of the process routine, the operation of the shutter release switch in the first release operation is made (step S101). When this switch operation is detected, the AE and AF processes are executed without light emission driving of the strobo light emitter (steps S102 and S103).

At this time, the shutter speed obtained in the AE process is provisionally set to Tv, the stop value to Av, and the above ISO sensitivity to Sv, and a state of AE lock and AF lock is assumed. In the AE lock, a check as to whether strobo light emission is necessary is executed, and, for the sake of brevity of description, the following description will be made only in connection with the case accompanied by the strobo light emission.

Subsequently, a check as to whether the shutter release operation has been made in a second release operation (step S104) and a check as to whether the shutter release switch has performed the first release operation (step S105), are made repeatedly, thereby awaiting the execution of the second release operation while maintaining the state obtained in the above AE and AF process.

When the first release operation is not maintained but is discontinued, it is detected in the step S105, and the shutter speed Tv, the stop value Av and the ISO sensitivity Sv, as obtained in the AE and AF processes, as well as the focal position, are all discarded, and the routine goes back to the step S101.

When the shutter release switch is operated in the second release operation, it is detected in the step S104, and immediately the strobo light emitter 33 is driven for preliminary light emission. The CCD 14 receives the resultant reflected light from the scene and checks the level thereof (step S106), and also makes a check from the detected level as to whether the intensity of light emitted from the strobo light emitter 33 is insufficient step S107: dimmer or light control.

In the detection of the reflected light accompanying the preliminary light emission, the reflected light level over the entire imaging surface of the CCD 14 may be checked in a uniform check, or the received light level check may be made by weighting a central part of the imaging surface or at the positions of a plurality of predetermined points including the central part and comparing the weighted level with a predetermined threshold level.

When a conclusion that sufficient emitted light intensity is obtained in the above check, no problem arises. However, when it is decoded that the emitted light intensity is insufficient, the ISO sensitivity is increased by increasing the gain of the pre-amplifier 16 in correspondence to the level difference between the detected light intensity and the threshold. Denoting the increase at this time by $\Delta Sv$, a correction value $\Delta Tv$ of the shutter speed Tv is set as $\Delta Sv = \Delta Tv$.

The sum of the addition of $\Delta Sv$ to the ISO sensitivity Sv provisionally set in the step S102 is set as new ISO sensitivity Sv for compensation (Sv←Sv+$\Delta Sv$), and the sum of the addition of $\Delta Tv$ to the shutter speed Tv provisionally set in the step S102 is set as the new shutter speed Tv for compensation (Tv←Tv+$\Delta Tv$) (step S108).

Subsequently, imaging is executed by causing regular light emission of the strobo light emitter 33 based on the focal position, the shutter speed Tv, the step value Av and the ISO sensitivity Sv having been set at this instant (step S109).

The image data obtained in the imaging is fed out from the image signal processing circuit 18 to the compressing/decompressing circuit 22 to be compressed and then recorded and stored in the memory card 23 (step S110). In the above way, a series of processes concerning slow synchronous imaging is ended, and the routine returns to the step S101 to be ready for the next shutter release switch operation.

Figure 3:
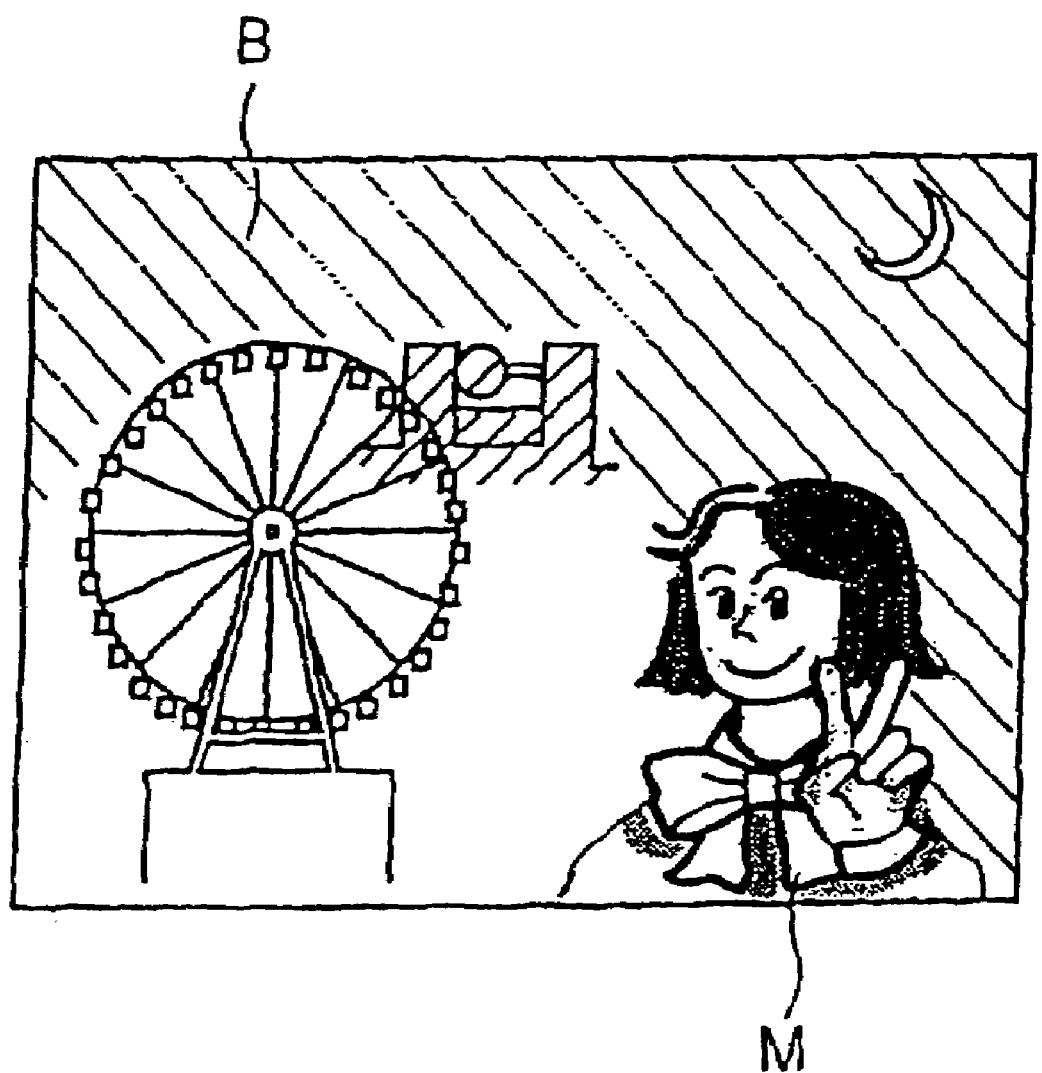
FIG. 3 shows an example of photographed image in the first embodiment.

FIG. 3 shows an example of an image I obtained through the process in the above step S108. Here, the main foreground subject M of the scene at a position relatively close to the digital camera 10, the ISO sensitivity Sv is increased based on the contents detected in the preliminary light emission of strobo for imaging in proper exposure, while for the background part not reached by the strobo light the shutter speed is increased to an extent corresponding to the increase of the ISO sensitivity Sv to let the background be imaged in proper exposure without excessive exposure.

It will be seen that when it is decided by the preliminary light emission from the strobo light emitter 33 that the emitted light intensity is insufficient, for obtaining the proper exposure of the main foreground subject of the scene, the ISO sensitivity Sv is compensated with reference to the exposure level obtained without light emission from the strobo light emitter 33 such that it is increased by a necessary level.

Thus, the main foreground subject is reliably imaged with proper exposure by the regular light emission from the strobo light emitter 33.

Also, it is assumed that the difference $\Delta Sv$ by which the ISO sensitivity Sv is increased is $\Delta Sv = \Delta Tv$, and the sum of the addition of the value $\Delta Tv$ to the shutter speed Tv is set as new shutter speed Tv for compensation.

Thus, it is possible to increase the shutter speed to an extent corresponding to the increase of the ISO sensitivity Sv and reduce the exposure time, thus reliably preventing excessive exposure of the background part not reached by the strobo light.

Since the strobo emission time is usually about 5 msec. (=$\frac{1}{200}$ sec.), a limitation may be imposed on the difference $\Delta Sv$ for increasing the ISO sensitivity for the strobo light emission time in the exposure time.

In this case, when the strobo light emission time TvLIMIT is TvLIMIT=7.64 (corresponding to 5 msec.) and $$\Delta Sv > TvLIMIT - Tv,$$

it is possible to limit the value of $\Delta Sv$ as $\Delta Sv = TvLIMIT - Tv$.

A second embodiment of the present invention applied to the digital camera will now be described with reference to the drawings.

The construction is basically the same as that is shown in FIG. 1. Like parts are thus designated by like reference numerals, and their illustration and description are not given.

The operation of the above embodiment will now be described.

Figure 4:
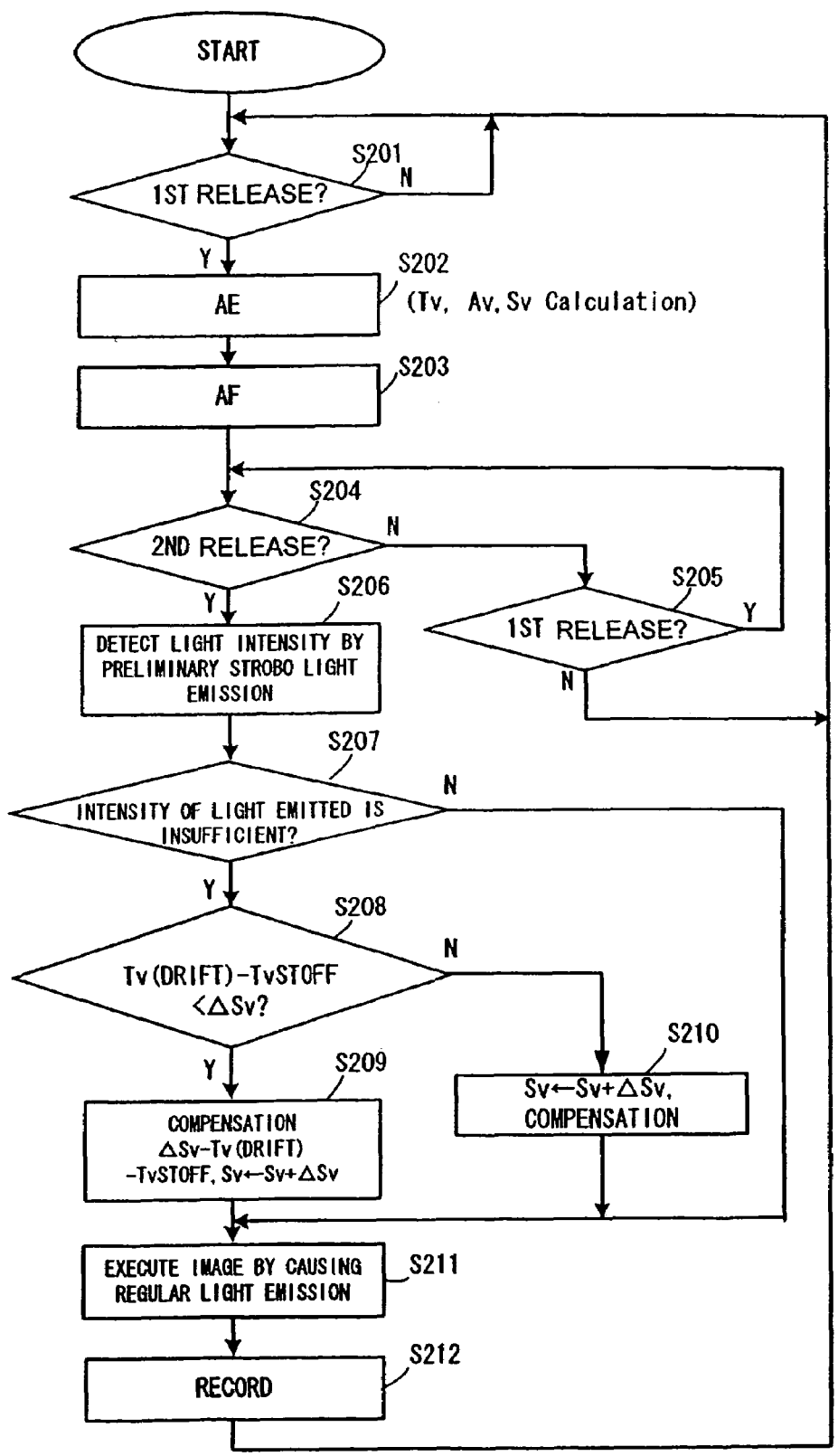
FIG. 4 is a flow chart illustrating an imaging operation of the blur (or hand shaking) limit emission setting of the digital camera according to a second embodiment of the present invention.

FIG. 4 is a flow chart illustrating an imaging operation in an auto light emission mode in the case of exposure control with blur (hand shook) limit shutter switch of, for instance, $\frac{1}{30}$ sec. (Tv=5) on the wide angle side and $\frac{1}{125}$ sec. (Tv=7) on the telescopic side with an aim of carrying out the imaging such that the main foreground subject of scene such as a person located relatively closely is illuminated by strobo light. The "blur limit shutter speed" is such a low speed side limit shutter speed that an image obtained as a result of the imaging is free from any blur recognizable by the observer, and is usually understood to correspond to the inverse of the focal distance (in mm) of the lens used for the imaging. In this embodiment, the exposure control is executed such that the exposure correction is executed with the blur limit shutter speed (hereinafter referred to as Tv) taken into consideration. All of the controls including the exposure control are executed with collective control of the control system by the system controller 24.

The shutter release switch in the operation switch unit 34 is operable step-wise in two strokes. In a first release, AE (auto exposure) without strobo light and AF (auto focusing) are executed. In a second release, a preliminary light emission of the strobo light emitter 33 is executed to correct the exposure level, and then a regular light emission is executed for the imaging.

At the outset of the process routine, the operation of the shutter release switch in the first release operation is made (step S201). When this switch operation is detected, the AE and AF operations are executed without light emission driving of the strobo light emitter 33 (steps S202 and S203).

At this time, the shutter speed obtained in the AE process is preliminarily set to Tv, the stop value to Av, and the above ISO sensitivity to Sv, and a state of AE lock and AF lock is assumed. In the AE lock, a check as to whether strobo light emission is necessary is executed. In the AE calculation process in imaging, when shutter speed TvSTOFF is determined and is lower than the above blur limit shutter speed Tv (blur), it is detected as shutter speed Tv in the initial stage, in this embodiment it is decided that strobo auto light emission operation at low brightness time is to be executed, and the actually set shutter speed is limited to Tv (blur). When the imaging is made with the above low shutter speed TvSTOFF, the background reached by the strobo light is properly exposed. When imaging is made with shutter speed Tv (blur) by causing strobo light emission, the main foreground subject of scene such as a person located a relatively short distance from the camera that it is reached by the strobo light is properly exposed, while the background part not reached by strobo light shows a tendency of insufficient exposure (or so-called under-exposure) corresponding to the limitation of the shutter speed to Tv (blur) instead of setting the low shutter speed TvSTOFF.

Subsequent to the above shutter speed selection, a check as to whether the shutter release operation has been made in the second release operation (step S204) and a check as to whether the shutter release switch has been operated in the first release operation (step S205), are executed repeatedly, thereby waiting for the execution of the second release operation while maintaining the state obtained in the above AE and AF processes.

When the first release operation is not maintained but is discontinued, it is detected in the step S205, the shutter speed Tv, the stop value Av and the ISO sensitivity Sv as well as the focus position obtained in the AE and AF processes, are all discarded, and the routine returns to the step S201.

When the shutter release switch is operated in the second release operation, it is detected in the step S204, and immediately the strobo light emitter 33 is driven for preliminary light emission. The CCD 14 receives the resultant reflected light from the scene and checks the level thereof (step S206), and also makes a check from the detected level as to whether the intensity of light emitted from the strobo light emitter 33 is insufficient step S207: dimmer or light control.

In the detection of the reflected light accompanying the preliminary light emission, the reflected light level over the entire imaging surface of the CCD 14 may be checked in a uniform check, or the received light level check may be executed by weighting a central part of the imaging surface or at the positions of a plurality of predetermined points including the central part and comparing the weighted level with a predetermined threshold level.

In this embodiment, no sensitivity increase control is executed up to the reaching of a value corresponding to the ISO sensitivity increase calculated as what corresponds to light intensity lack remaining after compensation by the strobo light emission, and it is executed by suppressing the ISO sensitivity increase up to a certain extent while taking the brightness of the background into consideration. Thus, the exposure of the background part in a range not reached by strobo light can be executed properly without resulting in over-exposure.

Calculation of Tv (blur—also referred to as "drift" or "camera shook")–TvSTOFF is executed, and a check is made as to whether the result of the calculation is less than the difference ΔSv, by which to increase the ISO sensitivity (step S208).

When it is decided that the result of the calculation Tv (blur)–TvSTOFF is less than the difference ΔSv, the result is set as new difference ΔSv for increasing the ISO sensitivity (ΔSv←Tv (blur)–TvSTOFF), and the sum of addition of this ΔSv to the ISO sensitivity provisionally set in the step S202 is set as a new ISO sensitivity Sv for compensation (Sv←Sv+ΔSv) (step S209).

When it is decided in the step S208 that the result of the calculation Tv (blur)–TvSTOFF is equal to or greater than the difference ΔSv which increases the ISO sensitivity, the difference ΔSv is used directly to set the sum of addition of ΔSv to the ISO sensitivity Sv provisionally set in the step S202 as new ISO sensitivity Sv for compensation (Sv←Sv+ΔS) (step S210).

Subsequently, the imaging is executed with regular light emission of the strobo light emitter 33 on the basis of the shutter speed Tv, the stop value Av and the ISO sensitivity Sv set at this moment (step S211).

Then, the image data obtained by the imaging operation is fed out from the digital processing circuit 18 to the compressing/de-compressing circuit 22 for data quantity compression, and then recorded and stored in the memory card 23 (step S212). Thus, a series of processes in the strobo light emission mode, taking the blur limit shutter speed into consideration, is completed, and the routine returns to the step S201 to be ready for the next shutter release switch operation.

As shown above, in this embodiment the sensitivity increase control is not made up to the value directly corresponding to the ISO sensitivity increase calculated as corresponding to the light intensity lack remaining after compensation by the strobo light emission, and it is executed by suppressing the ISO sensitivity to a certain extent while taking the brightness of the background into consideration.

Thus, the exposure of the background part located in a range not reached by strobo light can be properly controlled without resulting in over-exposure.

Also, it is possible to obtain more sophisticated proper exposure based on the brightness of the background part at the time of the strobo imaging while reliably preventing the occurrence of a blur.

Figure 5:
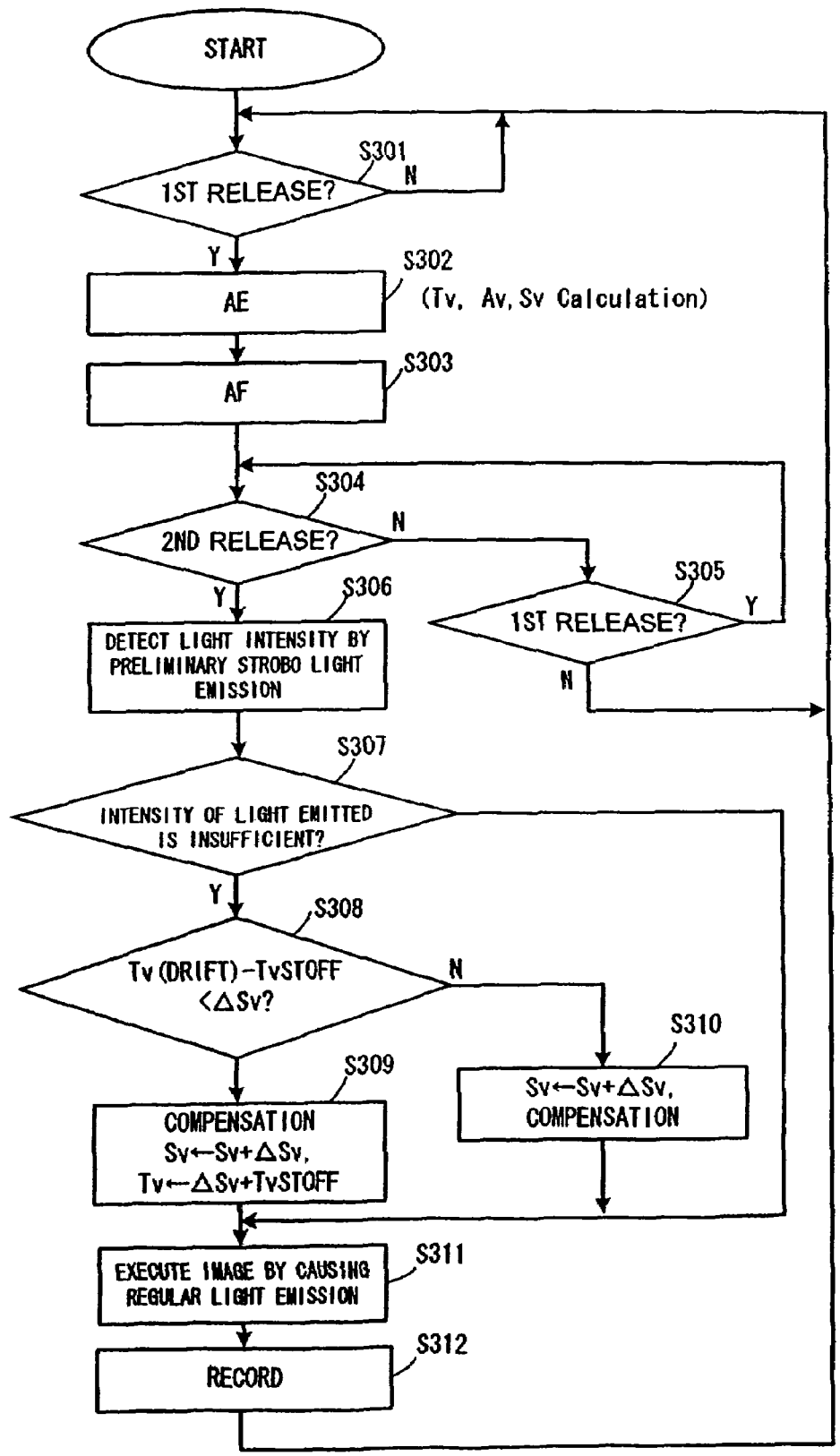
FIG. 5 is a flow chart illustrating another imaging operation of the blur limit emission setting of the digital camera in the second embodiment.

FIG. 5 is a flow chart illustrating an imaging operation in an auto light emission mode in the case of exposure control with blur limit shutter speed of, for instance, 1/30 sec. (Tv=5) on the wide angle side and 1/125 sec. (Tv=7) on the telescopic side with an aim of carrying out the imaging such that the main foreground subject of scene such as a person located relatively closely is illuminated by strobo light. The "blur limit shutter speed" is the same as described before, and all the controls including the exposure control taking the blur limit shutter speed (hereinafter referred to as Tv (blur)) in considerations are executed with collective control of the control system by the system controller 24.

The shutter release switch in the operation switch unit 34 is operable step-wise in two strokes. In a first release, AE (auto exposure) without strobo light and AF (auto focusing) are executed. In a second release, a preliminary light emission of the strobo light emitter 33 is executed to correct the exposure level, and then a regular light emission is executed for the imaging.

At the outset of the process routine, the operation of the shutter release switch in the first release operation is monitored (step S301). When the switch operation is detected, the AE and AF operations are executed without light emission driving of the strobo light emitter 33 (steps S302 and S303).

At this time, the shutter speed obtained in the AE process is preliminarily set to Tv, the stop value to Av, and the above ISO sensitivity to Sv, and a state of AE lock and AF lock is assumed. In the AE lock, a check as to whether strobo light emission is necessary is executed. In the AE calculation process in imaging, when shutter speed TvSTOFF is determined and is lower than the above blur limit shutter speed Tv (blur), it is detected as shutter speed Tv in the initial stage, in this embodiment it is decided that strobo auto light emission operation at low brightness time is to be executed, and the actually set shutter speed is limited to Tv (blur). When the imaging is made with the above low shutter speed TvSTOFF, the background reached by the strobo light is properly exposed. When imaging is made with shutter speed Tv (blur) by causing strobo light emission, the main foreground subject of a scene such as a person located to a relatively short distance that it is reached by the strobo light is properly exposed, while the background part not reached by strobo light shows a tendency of insufficient exposure (or so-called under-exposure) corresponding to the limitation of the shutter speed to Tv (blur) instead of setting the, low shutter speed TvSTOFF.

Subsequently, a check as to whether the shutter release operation has been made in the second release operation (step S304) and a check as to whether the shutter release switch has been operated in the first release operation (step S305), are made repeatedly, thereby waiting for the execution of the second release operation while maintaining the state obtained in the above AF and AE processes.

When the first release operation is not maintained but is discontinued, it is detected in the step S305, the shutter speed Tv, the stop value Av and the ISO sensitivity Sv as well as the focus position as obtained in the AF and AE processes, are all discarded, and the routine returns to the step S301.

When the shutter release switch is operated in the second release operation, it is detected in the step S304, and immediately the strobo light emitter 33 is driven for preliminary light emission. The CCD 14 receives the resultant reflected light from the scene and checks the level thereof (step S306), and also makes a check from the detected level as to whether the intensity of light emitted from the strobo light emitter 33 is insufficient step 307: dimmer or light control.

In the detection of the reflected light accompanying the preliminary light emission, the reflected light level over the entire imaging surface of the CCD 14 may be checked in a uniform check, or the received light level check may be executed by weighting a central part of the imaging surface or at the positions of a plurality of predetermined points including the central part and comparing the weighted level with a predetermined threshold level.

When it is decided as a result of the check that the emitted light intensity is not insufficient, no problem arises. However, when it is decided that the emitted light intensity is insufficient, the extent of insufficiency is then checked.

That is, calculation of Tv (blur)−TvSTOFF is executed, and a check is made as to whether the result of the calculation is less than the difference, by which to increase the ISO sensitivity (step S308).

When it is decided that the result is less than the difference $\Delta Sv$, the difference $\Delta Sv$ is used directly to set the sum of addition of $\Delta Sv$ to the ISO sensitivity provisionally set in the step S303 as new ISO sensitivity for compensation (Sv←Sv+$\Delta Sv$), and the sum of addition of $\Delta Sv$ and the shutter speed TvSTOFF without light emission from the strobo light emitter 33 as new shutter speed Tv for compensation (Tv←$\Delta Sv$+TvSTOFF) (step S309).

Actually, the shutter speed Tv is derived by calculating

Tv (blur)+$\Delta Sv$−(Tv (blur)−TvSTOFF)

and calculating the first and third terms (Tv (drift)) in the same equation.

However, when the difference $\Delta Sv$ for increasing the ISO sensitivity as reference of the check in the step S308 is greater than the result of calculation TvLIMIT−TvSTOFF (TvLIMIT: strobo light emission time, corresponding to 7.64 (5 msec.)), the shutter speed may be affected by the strobo light emission time. For providing limitation, therefore, it is possible to newly set the result of the calculation TvLIMIT−TvSTOFF as a new difference $\Delta Sv$ in addition to the process in the step S309, while setting the sum of addition of $\Delta Sv$ and the ISO sensitivity Sv provisionally set in the step S302 as new ISO sensitivity Sv (Sv←Sv+$\Delta Sv$) for compensation and also setting the shutter speed Tv as TvLIMIT as above (Tv←TvLIMIT) for compensation (step S309' not shown for simplicity and replacing step S309).

When it is decided in the step S308 that the result of the calculation Tv (blur)−TvSTOFF is equal to or greater than the difference $\Delta Sv$ for increasing the ISO sensitivity, the difference $\Delta Sv$ is used directly, and the sum of addition of $\Delta Sv$ to the gain Sv of the pre-amplifier 16 provisionally set in the step S303 is set as new gain Sv of the pre-amplifier 15 (Sv←Sv+$\Delta Sv$) for compensation (step S310).

Subsequently, the imaging is executed by causing regular light emission of the strobo light emitter 33 on the basis of the shutter speed Tv, the stop value Av and the ISO sensitivity Sv as well as the focal position set at that moment (step S311).

The image data obtained in this imaging is fed out from the image processing circuit 18 to the compressing/de-compressing circuit 22 for data quantity compression and then recorded and stored in the memory card 23 (step S312). In the above way, a series of processes in the strobo light emission mode taking the blur limit shutter speed into consideration is completed, and the routine returns to the step S301 to be ready for the next shutter release operation.

As shown above, in this case no sensitivity increase control is made up to the reaching of a value, which directly corresponds to the ISO sensitivity increase calculated as what corresponds to the light intensity lack remaining after compensation with strobo light emission, and it is executed by suppressing the ISO sensitivity increase to a certain extent while taking the brightness of the background into consideration. It is thus possible to obtain proper exposure control without over-exposure of the background part in a range not reached by strobo light.

In addition, the compensation of the shutter speed Tv is made, if necessary, as in the first embodiment without providing any limitation on the difference $\Delta Sv$ for increasing the ISO sensitivity.

Figure 6:
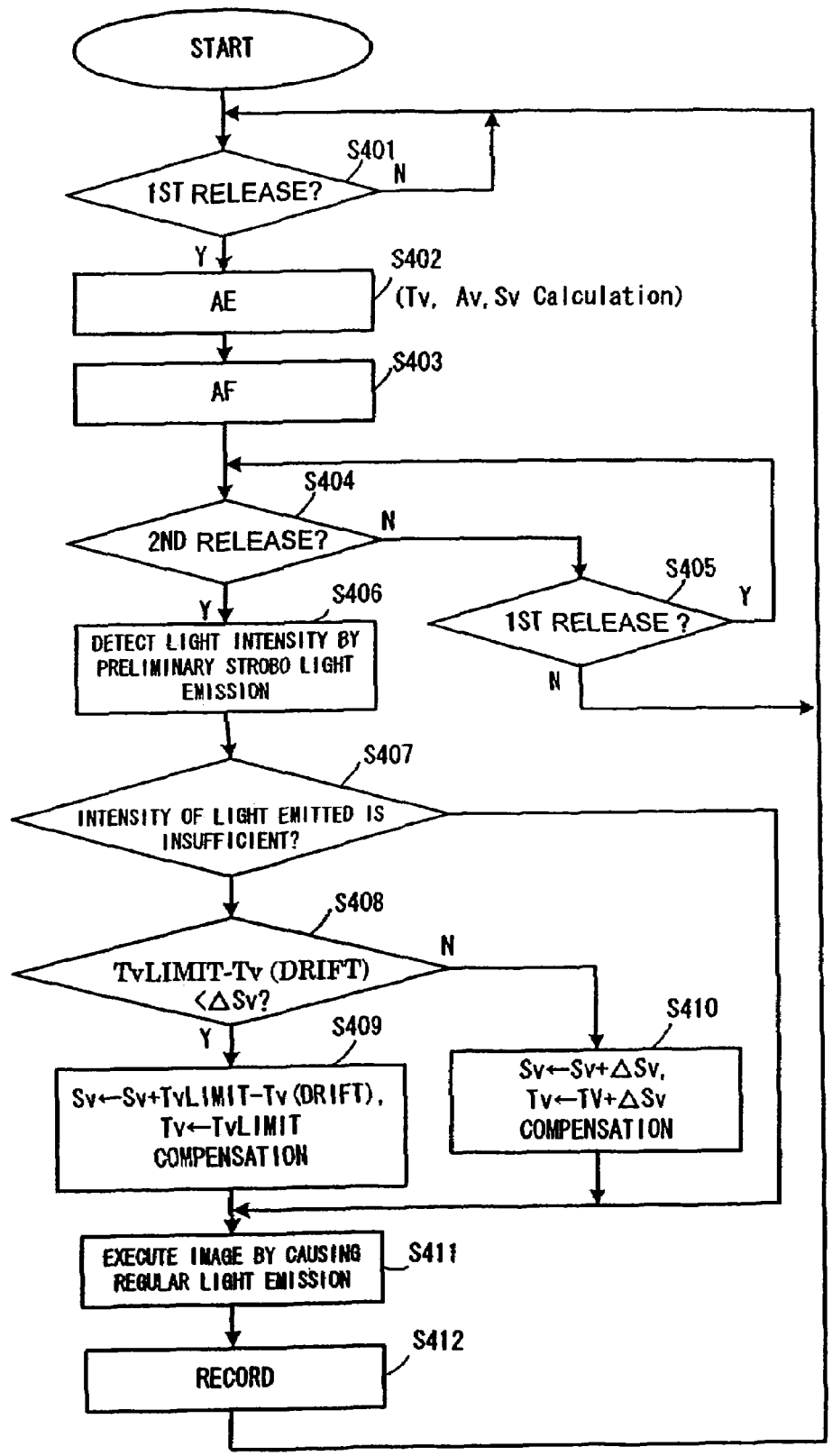
FIG. 6 is a flow chart illustrating other imaging operation of the blur limit emission setting of the digital camera in the second embodiment.

FIG. 6 is a flow chart illustrating an imaging operation in an auto light emission mode in the case of exposure control with blur limit shutter speed of, for instance, 1/30 sec. (Tv=5) on the wide angle side and 1/125 sec. (Tv=7) on the telescopic side with an aim of carrying out the imaging such that the main foreground subject of scene such as a person located relatively closely is illuminated by strobo light. The "blur limit shutter speed" is such a low speed side limit shutter speed that an image obtained as a result of the imaging is free from any blur recognizable by the observer, and is usually understood to correspond to the inverse of the focal distance (in mm) of the lens used for the imaging. All the controls including the exposure control, taking the blur limit shutter speed (hereinafter referred to as Tv (blur)) into consideration, are executed with collective control of the control system by the system controller 24. The shutter release switch in the operation switch unit 34 is to be operated in two strokes. In the first release operation, AE (auto exposure) and AF (auto focusing) are executed without strobo light emission. In the second release operation, the strobo light emitter 33 is driven for preliminary light emission for exposure compensation, and then driven for regular light emission to execute imaging.

At the outset of the process, the first release operation of the shutter release switch is monitored (step S401), and at the instant of detection of this operation the AF and AE processes are executed without light emission driving of the strobo light emitter 33 (steps S402 and S403).

At this time, the shutter speed obtained in the AE process is set to Tv, the stop value to Av and the ISO sensitivity to Sv, and particularly the stop value Av is set without any change while provisionally setting the shutter speed Tv and the ISO sensitivity to bring about a state of AF lock and AE lock inclusive of the ISO sensitivity. Again in this case, a check as to whether strobo light emission is necessary is executed in the AE lock. In the initial stage of the AE calculation process in the imaging, when the shutter speed Tv is calculated to be shutter speed TvSTOFF lower than the above blur limit shutter speed Tv (blur), in this case it is decided that an auto strobo light emission operation at low brightness time is to be executed, and the actually set shutter speed is limited by Tv (blur). When imaging is made at the above low shutter speed TvSTOFF, the background part not reached by strobo light is properly exposed. When imaging is made at the shutter speed TV (blur) by causing strobo light emission, proper exposure is obtainable with respect to the main foreground subject of the scene such as a person located relatively closely to be reached by strobo light. However, the background part not reached by any strobo light shows a tendency of insufficient exposure (or so-called under-exposure) corresponding to the limitation of the shutter speed to Tv (blur) without setting the low shutter speed TvSTOF.

Subsequently, a check as to whether the shutter release switch has been operated in the second release operation (step S404) and a check as to whether the first release operation has been maintained (step S405) is made repeatedly to await the second release operation while maintaining the state obtained in the AE and AF processes.

When the first release operation is not maintained but is released, this is detected in the step S405. At this time, the shutter speed Tv, the stop value Av and the ISO sensitivity Sv as well as the focal position obtained in the AE and AF processes, are all discarded, and the routine returns to the step S401.

When the shutter release switch is operated in the second release operation, this is detected in the step S404. At this time, the strobo light emitter 33 is driven immediately for preliminary light emission. The CCD 14 receives the resultant reflected light from the scene and detects the level of the received light (step S406), and checks from the detected level as to whether the intensity of light emitted from the strobo light emitter 33 is insufficient S407: dimmer or light control.

In the detection of the reflected light accompanying the preliminary light emission, the received light level may be checked over the entire imaging surface of the CCD 14 in a uniform check, or it may be checked by weighting only the central part or positions of a plurality of points including the central part and comparing the weighted level with a predetermined threshold level.

When it is decided as a result of the detection that the emitted light intensity is not insufficient, no problem arises. However, when the emitted light intensity is decided to be insufficient, the extent of insufficiency is checked.

Specifically, the shutter speed corresponding to the strobo light emission time is made to be TvLIMIT (TvLIMIT=7.64 (5 msec.)), and the blur limit of the shutter speed corresponding to the focal distance of the lens system 12 selected at this time is made to be Tv (blur).

The calculation TvLIMIT−Tv (blur) is thus made, and a check is made as to whether the result is less than the difference ΔSv for increasing the ISO sensitivity is checked (step S408).

When it is decided that the result is less than the difference ΔSv, the sum of addition of the result of the calculation TvLIMIT−Tv (blur) to the ISO sensitivity Sv provisionally set in the step S403 is set as new gain Sv of the preamplifier 16 (Sv←Sv+TvLIMIT−Tv (blur) for compensation, and the shutter speed TvLIMIT corresponding to the strobo light emission time as new shutter speed Tv (Tv←TvLIMIT) (step S409).

When it is decided in the step S408 that the result of the calculation TvLIMIT−Tv (blur) is equal to or greater than the difference ΔSv for increasing the ISO sensitivity, the difference ΔSv is used directly, and the sum of addition of ΔSv to the ISO sensitivity Sv provisionally set in the step S402 is set as new shutter speed Tv (Tv←Tv+ΔSv) for compensation (step S410).

Subsequently, the imaging is executed by causing light emission of the strobo light emitter 33 on the basis of the shutter speed Tv, the stop value Av and the ISO sensitivity Sv as well as the focal position set at this instant (step S411).

The image data obtained in this imaging is fed out from the digital processing circuit 18 to the compressing/de-compressing circuit 22 for data quantity compression and then recorded and stored in the memory card 23 (step S412). In the above way, a series of processes in the strobo light emission mode with the blur limit shutter speed taken into considerations is completed, and the routine returns to the step S401 to be ready for the next switch release operation.

As shown above, it is possible to obtain proper ISO sensitivity control without resulting in over-exposure of the background part belonging to a zone not reached by strobo light while securing an increase of the ISO sensitivity calculated as what corresponds to the lack of the emitted light intensity of the strobo. The lack of the emitted light intensity of the strobo and also the necessary ISO sensitivity increase are increased with increasing distance of the main foreground subject of the scene (that is, the necessary sensitivity increase is changed with a change in the distance of the main foreground subject). In this case, adverse effects of such a phenomenon are suppressed to obtain shutter speed control such as not to result in any background exposure level change.

It is thus possible to obtain more sophisticated proper exposure in dependence on the brightness of the background part while reliably preventing the occurrence of blur at the time of the strobo imaging.

In addition, it is possible to check the state of control by using as variables the shutter speed TvLIMIT corresponding to the strobo light emission time as a peculiar value of the camera and the blur limit (blur) of the shutter speed corresponding to the focal distance of the lens system 12 selected at that instant.

Thus, the calculation processes required for the control can be made easily, and it is possible to reduce the release time lag in the transition from the preliminary light emission until the execution of imaging with regular light emission after the second release operation.

In the above description, the sensitivity control function part for controlling the ISO sensitivity has been described in connection with an example that it is constituted by a circuit part (sensitivity control function part SCU) including the CDS 15, preamplifier 16 and A/D converter 17. In this case, the ISO sensitivity in the sensitivity control function part SCU, may be obtained mainly by controlling the ISO sensitivity with gain control of the preamplifier 16. However, the concept underlying the present invention is not limited to this example; for example, the ISO sensitivity control may be obtained, in addition to the above example, by controlling the signal gain in another circuit part (for instance image processing circuit 18) under control of the system controller 24.

The above embodiment includes various stages of the present invention, and it is possible to extract various inventions with suitable combinations of the disclosed plurality of prerequisite constituents. For example, even when some of the prerequisite constituents shown in the embodiment are deleted, it is possible to solve at least one of the problems described before to be solved according to the present invention, and in the case when at least one of the advantages described before obtainable according to the present invention is obtainable, the corresponding constitution with deletion of some of the prerequisite constituents can be extracted as an invention.

According to the present invention, automatic compensation of exposure including at least the above ISO sensitivity at the time of the strobo imaging is made with the exposure without strobo light emission as reference, it is possible to execute strobo imaging on the basis of automatic calculation and setting of proper exposure with respect to both the main foreground subject of the scene and the background part. in a zone not reached by strobo light.

Changes in construction will occur to those skilled in the art and various apparently different modifications and embodiments may be made without departing from the scope of the present invention. The subject matter set forth in the foregoing description and accompanying drawings is offered by way of illustration only. It is therefore intended that the foregoing description be regarded as illustrative rather than limiting.

What is claimed is:

1. A digital camera for automatically setting proper exposure for both background and an object comprising:

an imaging element for providing a photo-electric output corresponding to an image of a scene focused on an imaging surface of said imaging element, an a sensitivity control function part for controlling an ISO sensitivity of the camera corresponding to an amplification factor of a photo-electric output of the imaging element and a strobe part for projecting light onto the scene, the digital camera further comprising:

a main control part for collectively controlling a first exposure condition calculating operation for calculating a first proper exposure condition in imaging by the imaging element including the exposure time and ISO sensitivity without preliminary light emission from the strobe part, an operation for detecting an exposure amount in the imaging element by an exposure operation with preliminary light emission by the strobe part performed under the first proper exposure condition, a second exposure condition calculating operation for calculating a second exposure condition, based on the first exposure condition calculation operation, and an operation of enabling exposure of the imaging element as a regular imaging operation under the second exposure operation, wherein the main control part increases the ISO sensitivity as the second exposure condition, and reduces the exposure time to decrease the increase of the exposure amount according to the increase of the ISO sensitivity, so as to expose the imaging element as the regular imaging operation. in response to a determination that an intensity of light emitted from the strobe part is insufficient from the exposure amount obtained by the exposure operation with preliminary light emission.

2. A digital camera for automatically setting proper exposure for both background and an object comprising:

an imaging element for providing a photo-electric output corresponding to an image of a scene focused on an imaging surface of said imaging element, an exposure time control part for controlling an exposure time in the imaging element, a sensitivity control function part for controlling an ISO sensitivity of the camera corresponding to an amplification factor of a photo-electric output of the imaging element and a strobe part for projecting light onto the scene, the digital camera further comprising:

a main control part for collectively controlling a first exposure condition calculating operation for calculating a first proper exposure condition in imaging by the imaging element including the exposure time and ISO sensitivity without preliminary light emission from the strobe part. an operation for detecting an exposure amount in the imaging element by an exposure operation with preliminary light emission by the strobe part performed under the first proper exposure condition, a second exposure condition calculating operation for calculating a second exposure condition, based on the first exposure condition calculation operation, and an operation of enabling exposure of the imaging element as a regular imaging operation under the second exposure operation, wherein when it is determined that an intensity of light emitted from the strobe part is insufficient from the exposure amount obtained by the exposure operation with preliminary light emission, the main control part increases the ISO sensitivity as the second exposure condition, and reduces the exposure time to decrease the increase of the exposure amount according to the increase of the ISO sensitivity, so as to expose the imaging element as the regular imaging operation; and wherein the main control part determines the exposure condition to be applied to the regular imaging operation with compensation of the ISO sensitivity calculated in the first exposure condition calculating operation with execution of the second exposure condition calculating operation by calculating, as the exposure time, a first exposure time with provision of a condition that this exposure time is within a predetermined threshold value, and a second exposure time without providing said condition, and calculating a necessary extent of control of the ISO sensitivity corresponding to a difference between the first and second exposure times.

3. A digital camera for automatically setting proper exposure for both background and an object comprising:

an imaging element for providing a photo-electric output corresponding to an image of a scene focused on an imaging surface of said imaging element, an exposure time control part for controlling an exposure time in the imaging element, a sensitivity control function part for controlling an ISO sensitivity of the camera corresponding to an amplification factor of a photo-electric output of the imaging element and a strobe part for projecting light onto the scene, the digital camera further comprising:

a main control part for collectively controlling a first exposure condition calculating operation for calculating a first proper exposure condition in imaging by the imaging element including the exposure time and ISO sensitivity without preliminary light emission from the strobe part, an operation for detecting an exposure amount in the imaging element by an exposure operation with preliminary light emission by the strobe part performed under the first proper exposure condition, a second exposure condition calculating operation for calculating a second exposure condition, based on the first exposure condition calculation operation, and an operation of enabling exposure of the imaging element as a regular imaging operation under the second exposure operation, wherein when it is determined that an intensity of light emitted from the strobe cart is insufficient from the exposure amount obtained by the exposure operation with preliminary light emission, the main control part increases the ISO sensitivity as the second exposure condition, and reduces the exposure time to decrease the increase of the exposure amount according to the increase of the ISO sensitivity, so as to expose the imaging element as the regular imaging operation; and wherein the main control part calculates the exposure condition to be applied to the regular imaging operation with compensation of the ISO sensitivity calculated in the first exposure condition calculating operation and the exposure time with execution of the second exposure condition calculating operation by calculating, as the exposure time, a first exposure time with provision of a condition that this exposure time is within a predetermined threshold value, and a second exposure time without providing said condition, and calculating necessary extent of controls of the ISO sensitivity and the exposure time corresponding to compensation of a difference between the first and second exposure times, taking at least the calculated value into consideration.

4. A digital camera comprising an imaging element for providing a photo-electric output corresponding to an image of a scene focused on an imaging surface of said imaging element, an exposure time control part for controlling an exposure time in the imaging element, a sensitivity control function part for controlling an ISO sensitivity of the camera corresponding to an amplification factor of the photo-electric output of the imaging element and a strobe part for projecting light onto the scene, the digital camera further comprising:

a main control part for collectively controlling a first exposure condition calculating operation for calculating proper exposure conditions in imaging by the imaging element including the exposure time and ISO sensitivity without light emission from the strobe part, a second exposure condition calculating operation of the exposure condition for compensating at least the ISO sensitivity among the exposure conditions calculated in the first exposure condition calculating operation by dimmer or light control operation with the preliminary light emission of the strobe part, and an operation of enabling exposure in the imaging element as a regular imaging operation under the exposure condition calculated and determined in the second exposure condition calculating operation, the main control part executing, in a first control mode in which the exposure time is not limited to be within a predetermined threshold value, the calculating of the exposure condition to be applied to the regular imaging operation by compensating the exposure time calculated in the first exposure condition calculating operation, and executing, in a second control mode in which the exposure time is limited to be within the predetermined threshold value, the calculating of the exposure condition to be applied to the regular imaging operation with compensation of the ISO sensitivity calculated in the first exposure condition calculating operation by calculating, as effective exposure time, a first exposure time with provision of a condition that this exposure time is within a predetermined threshold, and a second exposure time without providing said condition, and calculating the necessary extent of control of the ISO sensitivity corresponding to the compensation of the difference between the first and second exposure times, taking at least the calculated value into consideration.

5. A digital camera comprising an imaging element for providing a photo-electric output corresponding to an image of a scene focused on an imaging surface of said imaging element, an exposure time control part for controlling an exposure time in the imaging element, a sensitivity control function part for controlling an ISO sensitivity of the camera corresponding to an amplification factor of a photo-electric output of the imaging element and a strobe part for projecting light onto the scene, the digital camera further comprising:

a main control part for collectively controlling a first exposure condition calculating operation for calculating proper exposure conditions in imaging by the imaging element including the exposure time and ISO sensitivity without light emission from the strobe part, a second exposure condition calculating operation of the exposure condition for compensating at least the ISO sensitivity among the exposure conditions calculated in the first exposure condition calculating operation by dimmer or light control operation with the preliminary light emission of the strobe part, and an operation of enabling exposure of the imaging element as a regular imaging operation under the exposure condition calculated and determined in the second exposure condition calculating operation, the main control part calculating, in a first control mode in which the exposure time is not limited to be within a predetermined threshold value, the exposure condition to be applied to the regular imaging operation by compensating the exposure time calculated in the first exposure condition calculating operation, and executing, in a second control mode in which the exposure time is limited to be within the predetermined threshold value, the calculating of the exposure condition to be applied to the regular imaging operation with compensation of the ISO sensitivity calculated in the first exposure condition calculating operation and the effective exposed time by calculating, as effective exposure time, a first exposure time with provision of a condition that this exposure time is within a predetermined threshold, and a second exposure time without providing said condition, and calculating the necessary extent of control of the ISO sensitivity corresponding to the compensation of the difference between the first and second exposure times, taking at least the calculated value into consideration.

6. A method for operating a digital camera to set proper exposure for both background and an object, comprising: an imaging element for providing a photo-electric output corresponding to an image of a scene focused on an imaging surface of the imaging element, an exposure time control part for controlling an exposure time in the imaging element, a sensitivity control function part for controlling an ISO sensitivity of the camera corresponding to an amplification factor of the photo-electric output of the imaging element and a strobe part for projecting light onto the scene, the method comprising:

a) determining proper exposure conditions for imaging by the imaging element including the exposure time and ISO sensitivity with the strobe part being off, b) detecting an exposure amount in the imaging element by an exposure operation with preliminary light emission by the strobe part performed under a first proper exposure condition, c) calculating a second exposure condition, based on the conditions obtained at step (a) and exposure amount obtained at step (b), and d) exposing the imaging element during a regular imaging operation employing the second exposure condition determined at step (c), wherein the ISO sensitivity is increased as the second exposure condition, and the exposure time is reduced to decrease the increase of the exposure amount according to the increase of the ISO sensitivity, so as to expose the imaging element as the regular imaging operation, only when it is determined that an intensity of light emitted from the strobe part is insufficient from the exposure amount obtained by the exposure operation with preliminary light emission.

7. A method for operating a digital camera comprising an imaging element for providing a photo-electric output corresponding to an image of a scene focused on an imaging surface of the imaging element, an exposure time control part for controlling an exposure time for the imaging element, a sensitivity control function part for controlling an ISO sensitivity of the camera corresponding to an amplification factor of the photo-electric output of the imaging element and a strobe part for projecting light onto the scene, the method comprising:

a) determining proper exposure conditions for imaging by the imaging element including the exposure time and ISO sensitivity while the strobe part is off, b) compensating at least the ISO sensitivity among the exposure conditions determined during step (a) by dimmer or light control operation during light emission of the strobe part, and c) operating the exposure time control part for controlling exposure of the imaging element as a regular imaging operation based on the exposure condition determined during step (b), step (b) further comprising:

determining the exposure condition to be employed during the regular imaging operation by compensating the exposure time determined during step (a) wherein the exposure time is not limited to be within a given threshold;

determining the exposure condition to be applied to the regular imaging operation wherein an effective exposure time is limited to be within a predetermined threshold value;

compensating the ISO sensitivity determined during step (a) by determining the first exposure time employing the condition that the first exposure time is within the predetermined threshold, determining a second exposure time absent said condition, and determining a necessary extent of control of the ISO sensitivity based upon a compensation of the difference between the first and second exposure times.

8. The method of claim 7 wherein at least a calculated value of the exposure time is taken into consideration when determining the necessary extent of control of the ISO sensitivity based upon the compensation of the difference between the first and second exposure time.

9. A method for operating a digital camera comprising an imaging element for providing a photo-electric output corresponding to an image of a scene focused on an imaging surface of said imaging element, an exposure time control part for controlling an exposure time in the imaging element, a sensitivity control function part for controlling an ISO sensitivity of the camera corresponding to an amplification factor of the photo-electric output of the imaging element and a strobe part for projecting light onto the scene, the method comprising:

a) determining proper exposure conditions for imaging by the imaging element including the exposure time and ISO sensitivity with the strobe part off, b) compensating at least the ISO sensitivity among the exposure conditions determined in step (a) by dimmer or light control operation during a light emission of the strobe part, and (c) operating the exposure time control part for controlling exposure of the imaging element as regular imaging operation under the exposure condition determined during step (b), step (b) further comprising:

determining, during a first mode in which the exposure time is not limited to be within a predetermined threshold value, the exposure condition to be employed during step (c) by compensating the exposure time determined during step (a) and determining, in a second mode in which the exposure time is limited to be within the predetermined threshold value, the exposure condition to be employed during step (c) with compensation of the ISO sensitivity determined during step (a) and the exposed time by determining, as the exposure time, a first exposure time with provision of a condition that the first exposure time is within a predetermined threshold, and a second exposure time absent said condition, and determining the necessary extent of control of the ISO sensitivity based upon a compensation of the difference between the first and second exposure times.

10. The method of claim 9 wherein at least the calculated value of the ISO sensitivity is taken into consideration for determining the necessary extent of control of the ISO sensitivity.

11. A method for operating a digital camera to set proper exposure for both background and an object, comprising: an imaging element for providing a photo-electric output corresponding to an image of a scene focused on an imaging surface of the imaging element, an exposure time control part for controlling an exposure time in the imaging element, a sensitivity control function part for controlling an ISO sensitivity of the camera corresponding to an amplification factor of the photo-electric output of the imaging element and a strobe part for projecting light onto the scene, the method comprising:

a) determining proper exposure conditions for imaging by the imaging element including the exposure time and ISO sensitivity with the strobe part being off, b) detecting an exposure amount in the imaging element by an exposure operation with preliminary light emission by the strobe part performed under a first proper exposure condition, c) calculating a second exposure condition, based on the conditions obtained at step (a) and exposure amount obtained at step (b), determining as the exposure time, a first exposure time with provision of a condition that said first exposure time is within a predetermined threshold value, determining a second exposure time in the absence of said condition, and controlling the ISO sensitivity corresponding to a difference between said first and second exposure times, and d) exposing the imaging element during a regular imaging operation employing the second exposure condition determined at step (c), wherein when it is determined that an intensity of light emitted from the strobe part is insufficient from the exposure amount obtained by the exposure operation with preliminary light emission, the ISO sensitivity is increased as the second exposure condition, and the exposure time is reduced to decrease the increase of the exposure amount according to the increase of the ISO sensitivity, so as to expose the imaging element as the regular imaging operation.

12. A method for operating a digital camera to set proper exposure for both background and an object, comprising: an imaging element for providing a photo-electric output corresponding to an image of a scene focused on an imaging surface of the imaging element, an exposure time control part for controlling an exposure time in the imaging element, a sensitivity control function part for controlling an ISO sensitivity of the camera corresponding to an amplification factor of the photo-electric output of the imaging element and a strobe part for projecting light onto the scene, the method comprising:

a) determining proper exposure conditions for imaging by the imaging element including the exposure time and ISO sensitivity with the strobe part being off, b) detecting an exposure amount in the imaging element by an exposure operation with preliminary light emission by the strobe part performed under a first proper exposure condition, c) calculating a second exposure condition, based on the conditions obtained at step (a) and exposure amount obtained at step (b), determining a first exposure time with provision of a condition that said first exposure time is within a predetermined threshold value, determining a second exposure time absent said condition, and determining a necessary extent of controls of the ISO sensitivity and the exposure time corresponding to compensation of a difference between the first and second exposure times, and d) exposing the imaging element during a regular imaging operation employing the second exposure condition determined at step (c), wherein when it is determined that an intensity of light emitted from the strobe part is insufficient from the exposure amount obtained by the exposure operation with preliminary light emission, the ISO sensitivity is increased as the second exposure condition, and the exposure time is reduced to decrease the increase of the exposure amount according to the increase of the ISO sensitivity, so as to expose the imaging element as the regular imaging operation.

* * * * *